(Model.)
W. S. BRIGHT.
Stock Car.
No. 239,713. Patented April 5, 1881.
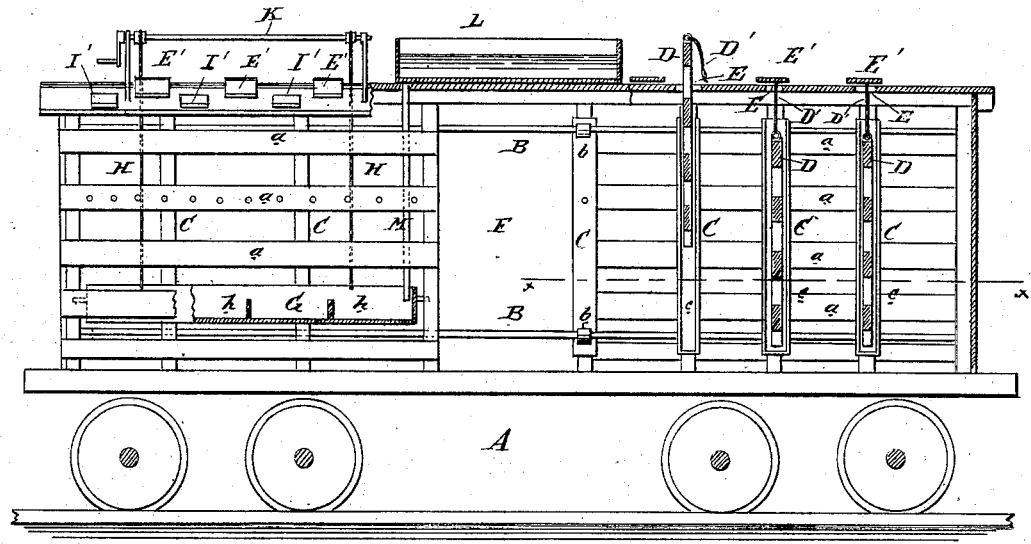
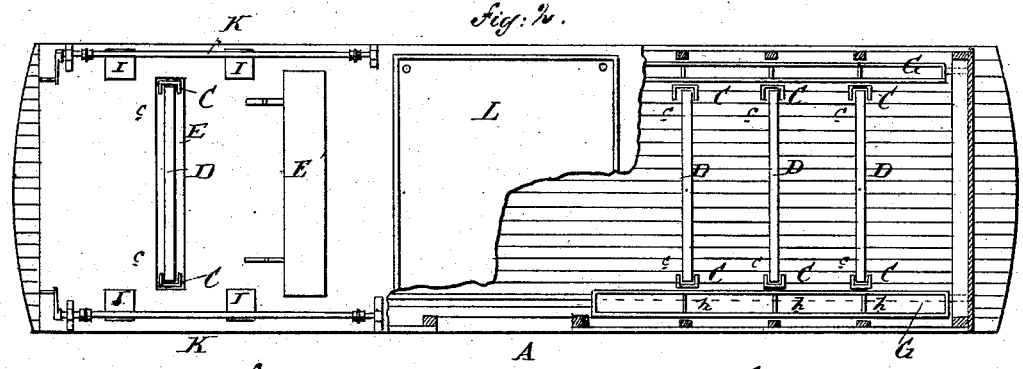
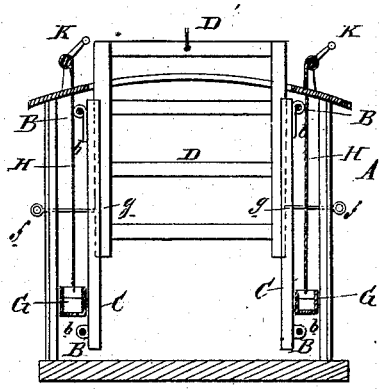
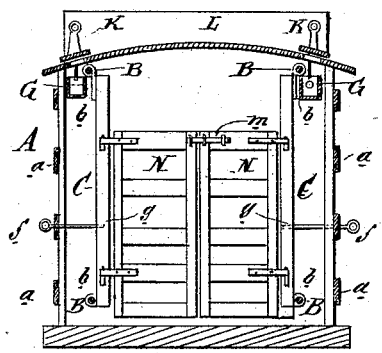
WITNESSES:
Chas. Nide
C. Sedgwick
INVENTOR:
W. S. Bright
BY Munn & Co.
ATTORNEYS.

UNITED STATES PATENT OFFICE.

WILLIAM S. BRIGHT, OF LETART, WEST VIRGINIA.

STOCK-CAR.

SPECIFICATION forming part of Letters Patent No. 239,713, dated April 5, 1881.

Application filed February 4, 1881. (Model.)

*To all whom it may concern:*

Be it known that I, WILLIAM S. BRIGHT, of Letart, in the county of Mason and State of West Virginia, have invented a new and Improved Stock-Car, of which the following is a full, clear, and exact description.

The object of this invention is to construct a stalled stock-car in such a manner that the stalls can readily be enlarged or reduced in size to accommodate the largest number of animals, and so that the animals can be conveniently supplied with water.

Figure 1 is a partly-sectional side elevation of the car with parts broken away to exhibit other parts. Fig. 2 is a plan of the same with parts broken away to exhibit other parts. Fig. 3 is a sectional end elevation of the same. Fig. 4 is a sectional end elevation, showing a modification of some of the parts.

Similar letters of reference indicate corresponding parts.

In the drawings, A represents the car, whose sides are slatted, as shown at $a$, for ventilation.

On both sides of the car A, on the inside thereof, are fixed stout rods B, two on each side, one near the bottom and the other near the top of the car, a short distance from the sides of the car A, and running the whole length thereof. Suspended vertically on these rods B B by ears $b$, so that they can be moved along said rods from one end to the other of the car, are a number of upright posts, C, having their faces vertically grooved, as shown at $c$, and turned inward, facing to the center of the car.

D D are slatted stall-slides, set between opposite posts C C, and arranged to be moved up and down in the grooves thereof, a rope, D', being made fast to each slide D, whereby said slide D can be elevated to any desired height through a transverse opening, E, made in the top of the car A, said openings E being closed, when desired, with doors E', that are hinged on the top of the car A. These slides D are designed to be about two-thirds the height of the car A from floor to ceiling, so that they may be elevated within the car without opening the doors E' sufficiently to permit hogs, sheep, &c., to pass beneath them.

Two opposite posts, C, and a slide, D, form a stall-partition. When it is desired to load the car A with cattle or horses through a central door, F, all these partitions C D may be moved to one end of the car A along the rods B B; then, as the animals are driven in one by one to the opposite end of the car, a partition, C D, is moved along on the bars B B to shut said animal in place, and then another animal is introduced into the car to the space adjoining the stall in which the first animal is, and a partition, C D, is moved along on the bars B B to form a stall, inclosing the second animal, and so on until the car is filled, the said partitions C D being held in place, when inclosing the animals, by pins $f f$, that are entered through the sides of the car A, as shown in Figs. 3 and 4, into sockets $g\ g$ in the edges of said partitions C D.

The car A may be provided with other doors than the central ones, F, for convenience of loading and unloading, and the partitions C D may be all brought together at the center of the car A preparatory to loading said car A from each end; or a door may be placed at each stall, if desired; or the car A can be conveniently loaded or unloaded by elevating all the partitions C D and lowering them one by one, as required.

When it is desired to put hogs or sheep in the same car and same stall with horses or cattle the partitions C D are pulled up by means of the ropes D' sufficiently to permit the passage of these smaller animals without permitting the larger ones to pass from one stall to another. It will be seen that by this arrangement of partitions C D the stalls can be made of any size to suit the animals therein confined.

Between the bars B B and the sides of the car A are spaces on each side extending the whole length of the car, and designed for accommodation of the feeding-troughs G G. These troughs G are preferably divided off into separate compartments by partitions $h$, and are designed to be of sufficient length to extend along two or more stalls. They are raised and lowered by means of attached ropes H, that pass up through openings I in the top of the car A, and are made fast to winches K, which are fixed on top of the car A, as shown. When said troughs are not in use or are to be filled with food they are drawn up, as shown in Fig. 4, the food being put in them through the openings I, and when in use said troughs G are lowered by the ropes H to or near the bottom of the car A, as shown in Figs. 1 and 3. Each opening I is provided with a cover, I', to exclude rain, &c.

A water-tank, L, is fixed about centrally on top of the car A, and hose M, designed to be provided with suitable cocks or cut-offs, conducts the water from tank L to troughs G, for watering the stock whenever desired.

In Fig. 4 is shown a modification of a partition, C D, wherein, instead of a slide, D, two slatted doors, N N, are hinged respectively to the opposite ungrooved posts C, so that said doors N N can swing horizontally, and when closed will meet centrally between the posts C C, and be secured by bolt and staples m or other convenient device.

Having thus described my invention, I claim as new and desire to secure by Letters Patent—

In a stock-car, the combination, with the horizontal bars B B, of the grooved posts C, provided with ears b, and slatted vertically-adjustable stall-slides D, substantially as herein shown and described.

WILLIAM SANDERSON BRIGHT.

Witnesses:
J. J. GRIMM,
DAN P. GIST.